United States Patent [19]

Braga et al.

[11] Patent Number: 5,360,849
[45] Date of Patent: Nov. 1, 1994

[54] MIXTURES OF BITUMEN AND POLYMER COMPOSITIONS SUITABLE FOR THE MODIFICATION OF BITUMENS

[75] Inventors: Vittorio Braga, Ferrara; Carlo Giavarini, Rome, both of Italy

[73] Assignee: Himont Incorporated, Wilmington, Del.

[21] Appl. No.: 125,948

[22] Filed: Sep. 23, 1993

[30] Foreign Application Priority Data

Sep. 24, 1992 [IT] Italy .......................... MI92 A 002198

[51] Int. Cl.$^5$ .................... C08L 95/00; C08L 23/12; C08L 23/16
[52] U.S. Cl. ........................ 524/68; 524/70; 524/71
[58] Field of Search ................. 524/59, 68, 70, 71; 525/240

[56] References Cited

U.S. PATENT DOCUMENTS

| | | | |
|---|---|---|---|
| 3,890,263 | 6/1975 | Meynard | 524/68 |
| 4,707,413 | 11/1987 | Kehr et al. | 524/70 |
| 4,829,109 | 5/1989 | Ciaccia et al. | 524/68 |
| 4,833,185 | 5/1989 | Fachini | 524/68 |
| 5,077,327 | 12/1991 | Cecchin . | |

*Primary Examiner*—James J. Seidleck
*Assistant Examiner*—M. L. Warzel

[57] ABSTRACT

A mixture containing bitumen and a polymer composition, characterized in that the polymer composition comprises:

A) 10–40 parts by weight of an isotactic propylene homopolymer, or a random copolymer of propylene with ethylene and/or a $C_4$–$C_{10}$ α-olefin;

B) 0–20 parts by weight of a copolymer fraction containing ethylene, which is insoluble in xylene at ambient temperature;

C) 50–80 parts by weight of a copolymer fraction of ethylene with propylene and/or $C_4$–$C_{10}$ α-olefin, said copolymer fraction being soluble in xylene at ambient temperature and having an intrinsic viscosity greater than 1.5 and up to 2.2 dl/g and having 20 to 45 wt. % ethylene.

12 Claims, No Drawings

MIXTURES OF BITUMEN AND POLYMER COMPOSITIONS SUITABLE FOR THE MODIFICATION OF BITUMENS

The present invention relates to mixtures comprising bitumens and polymer compositions particularly suitable to be used in the bitumen field and a method to prepare said mixtures.

Said compositions are introduced in the bitumens in order to modify the characteristics of same and make them more suitable for the use for which they are destined.

Bitumens have various applications, such as the preparation of paving material and waterproof toppings for example.

Polymer compositions containing propylene-ethylene or propylene-ethylene-diene that can be used to modify bitumens are already known in the art.

Published European patent application EP-A-411 627 in the name of the Applicant describes polymer compositions developed to be used in waterproof toppings. Said polymer compositions comprise two fractions, one of which is made up of a propylene homopolymer, and the other of a propylene-ethylene copolymer.

According to said patent application, the polymer compositions with the best properties for the use in bituminous mixtures for waterproof toppings must have an intrinsic viscosity (I.V.) ranging from 0.5 to 1.5 dl/g for both the above mentioned polymer fractions.

The polymer compositions used for that purpose up to now, however, have not provided modified bitumens with totally satisfactory performance characteristics. The most serious problem presented by the bitumens containing the above mentioned polymer compositions is the resistance of such mixtures to aging. In fact, these mixtures do not have good storage stability over time because they tend to separate readily, and consequently the mixtures lose their properties.

The present invention rectifies the disadvantages associated with the use of the above mentioned polymer composition/bitumen mixtures by providing a polymer composition having physical-chemical properties and chemical composition characteristics different from the ones used up to now. In fact, it has now been found that the polymer compositions having an intrinsic viscosity higher than those of the prior art provide bituminous mixtures having flexibility at low temperatures, penetration and softening, which is maintained over time regardless of the age of the mixture.

Another advantage of the bituminous mixtures of the present invention is good ductility.

Therefore, object of the present invention are bitumenous mixtures containing polymer compositions comprising the following fractions:

A) 10–40 parts by weight, preferably 20–40, of an isotactic propylene homopolymer with an isotactic index greater than 80, preferably from 85 to 99, or a random copolymer of propylene with ethylene or a $C_4$–$C_{10}$ $\alpha$-olefin having the formula $CH_2$=$CHR$, wherein R is an alkyl radical with 2–8 carbon atoms, or mixtures thereof, said copolymer having a content of ethylene or $C_4$–$C_{10}$ $\alpha$-olefin or combinations thereof from 1 to 10% by weight, and an isotactic index in boiling n-heptane greater than 80;

B) 0–20 parts by weight of a copolymer fraction containing over 55 wt. %, preferably from 60 to 95 wt. % ethylene units, which is insoluble in xylene at ambient temperature;

c) 50–80 parts by weight, preferably 60–80, of a copolymer fraction of ethylene with propylene or $C_4$–$C_{10}$ $\alpha$-olefin having the formula $CH_2$=$CHR$, wherein R is an alkyl radical with 2–8 carbon atoms, or mixtures thereof, and optionally a minor quantity of diene, said copolymer fraction being soluble in xylene at ambient temperature, and having an intrinsic viscosity in tetrahydronaphthalene at 135° C. greater than 1.5 and up to 2.2 dl/g.

The preferred polymer compositions are those wherein the intrinsic viscosity of fraction C) is from 1.6 and 2.0 dl/g, while the intrinsic viscosity of fraction A) is preferably from 0.5 and 1.7 dl/g.

The preferred quantity of ethylene or $C_4$–$C_{10}$ $\alpha$-olefin or mixtures thereof in the copolymer of fraction A) is from 2 to 5% by weight, while in fraction C) the preferred quantity of ethylene is from 15 to 60% by weight, preferably from 20 to 45%.

When fraction B) is present, it is preferable that it be present in quantities equal to or higher than 1.

The preferred quantity of diene in fraction C is from 1 to 4% by weight.

The desired intrinsic viscosity for the polymer compositions to be used in the mixtures of the invention can be obtained directly in polymerization, by adequately regulating the molecular weight regulator (hydrogen, for example), or can be obtained by subjecting said polymer compositions to visbreaking. Said polymer chain scissioning or visbreaking is carried out by using well known techniques. One of them consists of using peroxides which are added in sufficient quantities to the polymer composition to provide the desired degree of visbreaking, upon heating, generally in an extruder.

The peroxides which are most conveniently used in the polymer composition visbreaking process have a decomposition temperature preferably ranging from 150° to 250° C. Examples of said peroxides are di-tert-butyl peroxide, dicumyl peroxide, 2,5-dimethyl-2,5-di(-tert-butylperoxy)hexyne and Luperox 101 2,5-dimethyl-2,5-di(tert-butylperoxy)hexane, all of which are commercially available.

The quantity of peroxide necessary for the visbreaking process preferably ranges from 0.001 to 1.5% by weight of the polymer, more preferably from 0.002 to 0.6%.

Whether used as is, or subjected to visbreaking before being used in the mixtures of this invention, the polymer compositions can be prepared by way of a polymerization process comprising at least two steps: wherein the monomers are polymerized in the first step (or first steps) to form component A), while in the subsequent step or steps the mixtures comprising ethylene and propylene, ethylene and another $\alpha$-olefin, ethylene propylene and another $\alpha$-olefin and optionally a diene, are polymerized to form components B) and C).

Examples of this kind of polymerization processes are described in the above mentioned EP-A-411 627 patent application.

The polymerization can be carried out in liquid phase, gas phase or in a combination of liquid and gas phases.

The polymerization of the propylene to form component A can be carried out in the presence of ethylene, or an $\alpha$-olefin, such as 1-butene, 1-pentene, 4-methyl-1-pentene, 1-hexene and 1-octene, or a combination thereof.

The temperature in the polymerization step for the preparation of component A), and that for the preparation of components B) and C), can be the same or different. Usually, the polymerization temperature ranges from 40° to 90° C. with a temperature from 50° to 80° C. being preferred for the preparation of component A) and from 40° to 60° C. for the preparation of components B) and C).

The operation takes place at atmospheric pressure or higher. If the polymerization is carried out in gas phase, the pressure can range from 5 to 30 atm.

The residence times relative to the various polymerization stages depend on the desired ratio between fraction A) and fractions B)+C). Generally they range from 15 minutes to 8 hours.

As molecular weight regulators the commonly known chain transfer agents, such as hydrogen, and ZnEt₂ can be utilized.

The catalysts used in the polymerization process are characterized in that they are capable of producing polypropylene with an isotactic index greater than 80, preferably greater than 90, more preferably greater than 95. The catalysts that have the above mentioned characteristics are well known in patent literature. Particularly adequate are the catalysts described in U.S. Pat. No. 4,339,054 and European patent 45,977. Other examples of catalysts are described in U.S. Pat. Nos. 4,472,524 and 4,473,660.

The above mentioned stereospecific catalysts used in the polymerization comprise the reaction product between a) a solid component, containing a titanium compound and an electron-donor compound (internal electron-donor) supported on magnesium chloride, b) an aluminum alkyl compound, and c) an electron-donor compound (external electron-donor).

The solid component a) contains, as electron-donor, a compound selected from ethers, ketones, lactones, compounds containing N, P and/or S atoms, and mono- and dicarboxylic acid esters. Particularly suitable are phthalic acid esters, such as diisobutyl, dioctyl, diphenyl, and monobenzyl monobutyl phthalate; malonic acid esters, such as diisobutyl and diethyl malonate; alkyl and aryl pivalates; alkyl, cycloalkyl and aryl maleates; alkyl and aryl carbonates such as diisobutyl carbonate, monoethyl monophenyl carbonate and diphenyl carbonate; succinic acid esters such as mono and diethyl succinate. Other particularly suitable electron-donors are the 1,3-diethers of formula (I)

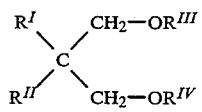

(I)

wherein $R^I$ and $R^{II}$ are the same or different and are $C^1$–$C^{18}$ alkyl, $C^3$–$C^{18}$ cycloalkyl or $C_6$–$C_{18}$ aryl radicals; $R^{III}$ and $R^{IV}$ are the same or different and are alkyl radicals having from 1 to 4 carbon atoms.

The ethers of the above type are described in published European patent application EP-A-361 493.

Representative examples of the ethers of formula (I) are 2-methyl-2-isopropyl-1,3-dimethoxy propane, 2,2-diisobutyl-1,3-dimethoxy propane, and 2-isopropyl-2-cyclopentyl-1,3-dimethoxy propane.

The above catalyst components are prepared according to various methods. One of them consists in milling or co-milling the magnesium dihalide, which is used in the anhydrous state, i.e. containing less than 1% of water, with the titanium compound and the electron-donor compound, under conditions wherein the magnesium dihalide is activated; the milled product is then treated one or more times with an excess TiCl₄ at a temperature from 80° to 135° C., after which it is washed repeatedly with a hydrocarbon (hexane, for example) until there are no more chlorine ions in the wash waters.

According to another method, the anhydrous magnesium dihalide is preactivated according to known methods, and then reacted with an excess TiCl₄ containing the electron-donor compound in solution. The operation takes place at a temperature from 80° C. and 135° C. Optionally, the treatment with TiCl₄ can be repeated and the solid is then washed with hexane, or other hydrocarbon solvents, in order to eliminate all traces of unreacted TiCl₄.

According to another method, a MgCl₂.nROH adduct (in particular in the form of spheroidal particles), wherein n is generally a number from 1 and 3, and ROH is ethanol, butanol, or isobutanol, is reacted with an excess TiCl₄ containing the electron-donor compound in solution. The temperature generally is from 80° C. to 120° C. The solid is then isolated and reacted one or more times with the TiCl₄, after which it is washed with a hydrocarbon until all traces of unreacted TiCl₄ have been eliminated.

According to another method, magnesium alcoholates and magnesium chloroalcoholates (the latter prepared according to the method described in U.S. Pat. No. 4,220,554) are reacted with an excess of TiCl₄ containing the electron-donor compound in solution, operating under the reaction conditions described above.

In the solid catalyst component, the titanium compound expressed as Ti content, is generally present in a percentage from 0.5 to 10% by weight, and the quantity of electron-donor compound which remains fixed on the solid component (internal donor), generally is from 5 to 20% in moles with respect to the magnesium dihalide.

The titanium compounds which can be used for the preparation of the solid catalyst component are titanium halides and titanium halogen alcoholates. Titanium tetrachloride is the preferred compound. Satisfactory results can be obtained also with titanium trihalides, particularly TiCl₃.HR, TiCl₃.ARA, and titanium halide alcoholates, such as TiCl₃OR, wherein R is a phenyl radical.

The reactions indicated above bring to the formation of a magnesium dihalide in active form. Besides these reactions, other reactions are known in the art which cause the formation of activated magnesium halide starting from magnesium compounds different from the magnesium halides, such as magnesium carboxylates.

The active form of magnesium dihalide in the catalyst component can be recognized by the fact that in the X-ray spectrum of the catalyst component the major intensity reflection shows a width at half-peak at least 30% greater than the one of the major intensity reflection which appears in the unactivated Mg dihalide spectrum, or by the fact that the major intensity reflection which appears in the spectrum of the unactivated magnesium dihalide (having a surface area smaller than 3 m²/g), is no longer present: in its place there is a halo with the maximum intensity shifted with respect to the position of the major intensity reflection of the unactivated magnesium dihalide. The most active forms are those where the X-ray spectrum shows a halo.

Among the magnesium halides, the magnesium chloride is the preferred compound. In the case of the most active forms of magnesium chloride, the X-ray spectrum of the catalyst component shows a halo instead of the reflection which in the spectrum of the unactivated magnesium chloride appears at a distance of 2.56 Å.

As cocatalysts (b), trialkylaluminum compounds, such as, for example, Al-triethyl, Al-triisobutyl and Al-tri-n-butyl are preferably used. Other examples of cocatalysts (b) are the linear or cyclic Al-alkyl compounds containing two or more Al atoms bonded by means of O or N atoms, or $SO_2$, $SO_3$ or $SO_4$ groups. Some examples of these compounds are:

$(C_2H_5)_2—Al—O—Al(C_2H_5)_2$ $(C_2H_5)_2—Al—N(C_6H_5)—Al(C_2H_5)_2$ $(C_2H_5)_2—Al—SO_2—Al(C_2H_5)_2$ $CH_3[(CH_3)Al—O—]_n—Al(CH_3)_2$ $—[(CH_3)Al—O]_n—$ wherein n is a number from 1 to 20.

Also $AlR_2H$ and $AlR_2OR'$ compounds, wherein R is an alkyl radical having 1 to 6 carbon atoms and R' is a phenyl radical substituted in one or more positions, can be used.

The Al-alkyl compound is generally used in such quantities that the Al/Ti ratio ranges from 1 to 1000.

The electron-donor compounds, that can be used as external donors added to the Al-alkyl compound, comprise aromatic acid esters (such as alkyl benzoates), heterocyclic compounds (such as 2,2,6,6-tetramethylpiperidine and 2,6-diisopropylpiperidine), and in particular silicon compounds containing at least one Si—OR bond (where R is a hydrocarbon radical). Some examples of silicon compounds are: $(tert-C_4H_9)_2Si(OCH_3)_2$, $(C_6H_{11})_2Si(OCH_3)_2$ and $(C_6H_5)_2Si(OCH_3)_2$. The 1,3-diethers of formula (I) can also be used as external donors. In the case where the internal donor is one of the 1,3-diethers of formula (I), the external donor can be omitted.

The catalysts can be precontacted with small quantities of olefin (prepolymerization) maintaining the catalyst in suspension in a hydrocarbon solvent and polymerizing at a temperature ranging from ambient to 60° C. The quantity of polymer produced ranges from 0.5 to 3 times the weight of the catalyst. The prepolymerization can also be carried out in liquid monomer, in which case the quantities of polymer produced can reach 1000 g per g of catalyst.

The polymer compositions are incorporated in the bitumens according to known methods, The quantity of polymer composition used generally ranges from 3 to 40% by weight with respect to the total weight of the bituminous mixture. In particular, the amount of polymer composition in the bituminous mixtures for waterproof toppings varies preferably from 10 to 40% by weight, more preferably from 10 to 30%, while in materials to be used for paving ranges preferably from 3 to 10% by weight.

The following examples are given in order to illustrate, but not limit the present invention.

The data reported in above description and in the examples, relating to the following polymer composition properties have been determined according to the methods indicated below:

| Property | Method |
| --- | --- |
| Molecular weight | GPC |
| Intrinsec viscosity | Determined in tetraline at 135° C. |
| Melt flow rate MFR | ASTM D-1238/L |

The properties of the polymer composition/bitumen mixtures have been determined as follows:

| Property | Method |
| --- | --- |
| Penetration | ASTM D-5 |
| Ball & Ring (B&R) | ASTM D-36 |
| Ductility | ASTM D-113-86 |
| Stability | ASTM D-36 |
| Aging | ASTM D-2872 |
| Embrittlement temperature | UNI 8202 (part 15) |

The embrittlement temperature is a parameter that is correlated to the flexibility of the mixture, and corresponds to the temperature that causes a punched sample, prepared as described below, to break when it is bent at 180° C. according to the test method mentioned above.

The specimens on which the mixture stability measurements are carried out are prepared by the following method: an aluminum pipe (12 cm high and 2 cm diameter) is filled with the bitumen-polymer composition mixture and left in the vertical position for 5 days at 140° C. The pipe is then cut in half thus obtaining the specimens on which the characterization are carried out according to the above mentioned test method.

The viscosity of the bitumen-polymer composition mixture is measured using a Haake viscosimeter.

Preparation of the Polymer-Bitumen Mixtures

The bitumen-polymer composition mixtures have been prepared following one of the procedures generally used by the experts in the field.

Before making the bitumen-polymer composition mixture, the polymer composition is subjected to a visbreaking process. The visbreaking agent used is a peroxide, namely 2,5-dimethyl-2,5-di(tert-butylperoxy)hexane. The addition of peroxide to the polymer composition occurs by mixing using a Werner co-rotating twin-screw extruder with a L/D=20/30. The extrusion takes place at 100-200 rpm and a temperature of 170°-210° C. The extruded polymer strand is then cooled and cut into pellets in water.

The bitumen used in the tests can be obtained either by using steam refining (SR) or visbreaking (VB).

The paving mixtures have been prepared using both SR and VB bitumen, while the ones for waterproof toppings contain only VB bitumen.

The waterproof topping mixtures have been obtained with bitumens belonging to the penetration class of 180-200 dmm (decimillimeters), measured at 25° C., and having an embrittlement temperature of −5°-0° C. and a B&R of 40°-50° C.

a) Preparation of Paving Material Samples

In a L4R Silverstone mixer equipped with homogenizing die, are mixed, at 4000 rpm, a bitumen and the polymer composition prepared as set forth hereinbelow, which is added in a quantity equal to 6% by weight with respect to the total weight of the mixture. The homogenizing die is introduced in the bitumen (400 g) preheated to 160° C. and placed in a heating cap with the temperature set at 180° C. After 10 minutes at 180° C. one adds the polymer composition and the mixing continues for three hours. At the end of the mixing the samples for the characterization are prepared; the samples are kept at ambient temperature or in a refrigerator.

b) Preparation of the Samples for Waterproof Toppings

In a modified Silverstone mixer are blended, at 800 rpm, a bitumen belonging to the 180/200 penetration class and brought to a temperature of 175°–185° C. for 45 minutes, and the polymer composition, which is added in a quantity equal to 20% by weight with respect to the total weight of the mixture.

From the mixture thus obtained one prepares a sheet 14 cm wide and 25 cm long by using the following method. On a steel foil one places a sheet of oiled paper, a sheet of glass wool, and a 4 mm thick metal template. In the template cavity are poured about 100 g of the melted polymer composition-bitumen mixture. Another sheet of oiled paper is placed over the mixture, and over the entire thing one places a metal plate with a 10 kg weight on it. The system is allowed to cool to ambient temperature for one hour, the foil is taken out, the sheets of oiled paper are removed, and the foil is cut in 2.5×7×0.4 cm strips, on which are carried out the various characterizations.

The specimens for the stability tests are prepared as described above.

Tables 1 and 2 show the values relative to the intrinsic viscosity of the polymer compositions pertaining to the mixtures of the invention, and the polymer compositions used in the mixtures as comparison.

Table 3 shows the physical characteristics relative to the bitumens used in the mixtures used for paving materials.

Tables 4 and 5 show the data concerning the characteristics of the mixtures obtained with the various polymer compositions, used in paving materials and waterproof toppings respectively.

Polymer composition I has been obtained by sequential copolymerization using a high-yield, highly stereospecific Ziegler-Natta catalyst supported on magnesium chloride, and comprises:

A) 35% of crystalline copolymer of propylene with 3.5% by weight of ethylene;

B) 2% by weight of a copolymer fraction, containing ethylene, insoluble in xylene at ambient temperature;

C) 63% by weight of a propylene-ethylene copolymer fraction, containing 27% by weight of ethylene, soluble in xylene at ambient temperature.

The compositions from II to VII have been obtained by extruding, with the method described above, composition I with the following quantities of Luperox 101 peroxide (in ppm):

| Composition | Quantity of Luperox 101 |
| --- | --- |
| II | 200 |
| III | 900 |
| IV | 4500 |
| V | 450 |
| VI | 800 |
| VII | 3500 |

TABLE 1

Polymer compositions for paving materials

| Polymer Compos. | MFR dg/min | I.V. total dl/g | I.V. dl/g (1) | I.V. dl/g (2) | Mw × $10^{-3}$ | Mn × $10^{-3}$ |
| --- | --- | --- | --- | --- | --- | --- |
| I | 0.6 | 2.70 | 3.20 | 1.50 | 513 | 65 |
| II | 4.0 | 1.75 | 1.98 | 1.33 | 283 | 47 |
| III | 20.0 | 1.25 | 1.46 | 1.09 | 183 | 38 |
| IV | 120.0 | — | 1.39 | 0.93 | (3) | (3) |

(1): I.V. of polymer portion soluble in xylene;
(2): I.V. of polymer portion insoluble in xylene;
(3): with gels.

TABLE 2

Polymer compositions for waterproof toppings

| Polymer Compos. | MFR dg/min | I.V. total dl/g | I.V. dl/g (1) | I.V. dl/g (2) |
| --- | --- | --- | --- | --- |
| I | 0.6 | 2.70 | 3.20 | 1.50 |
| V | 8.0 | 1.52 | 1.66 | 1.21 |
| VI | 16.0 | 1.34 | 1.42 | 1.18 |
| VII | 75.0 | 1.27 | 1.40 | 1.01 |

(1): I.V. of polymer portion soluble in xylene;
(2): I.V. of polymer portion insoluble in xylene;

TABLE 3

Characteristics of bitumens used in mixtures for paving

| Bitumen | B&R °C. | Penetration 25° C. dmm | P.I. (1) | Ductility % | Asphaltene (2) % weight | Aging B&R % | Aging penetrat. % |
| --- | --- | --- | --- | --- | --- | --- | --- |
| SR | 44 | 133 | 0.0 | 10.0 | 7.0 | +9 | −45 |
| VB | 40 | 157 | 1.1 | 7.5 | 16.7 | +35 | −61 |

(1): P.I. is the penetration index, which is calculated by using the following equation: (lg800 − lgPenetration)/(B&R − 25) = (1/50) · [(20 − P.I.)/(10 + P.I.)]
(2): the % of asphaltene is calculated with the IP-243 method.

TABLE 4

Mixtures destined for paving

| | Example | | | | | | | |
| --- | --- | --- | --- | --- | --- | --- | --- | --- |
| | 1c | 2c | 1 | 2 | 3c | 4c | 5c | 6c |
| comp. Polym. | I | | II | | III | | IV | |
| Bitumen | SR | VB | SR | VB | SR | VB | SR | VB |
| B&R °C. | 68 | 79 | 83 | 78 | 48 | 51 | 48 | 54 |
| Penetration at 25° C. dmm | 51 | 46 | 40 | 46 | 74 | 56 | 65 | 55 |
| P.I. (1) | 2.5 | 3.9 | 4.1 | 3.8 | −0.7 | −0.7 | −1 | 0 |
| Ductility at 10° C. % | SB | SB | 55 | 50 | 20 | SB | 9 | RP |

TABLE 4-continued

| | Mixtures destined for paving | | | | | | | |
|---|---|---|---|---|---|---|---|---|
| | Example | | | | | | | |
| | 1c | 2c | 1 | 2 | 3c | 4c | 5c | 6c |
| Stability (2) | | | | | | | | |
| B&R upper °C. | >125 | >125 | 62 | 89 | 55 | >125 | >125 | >125 |
| B&R lower °C. | 50 | 49 | 45 | 51 | 46 | 50 | 46 | 49 |
| Aging % B&R | — | — | +3 | +8 | +14 | — | — | — |
| Aging % penet. | — | — | −23 | −33 | −39 | — | — | — |

(1): see table 3
(2): the measurements were conducted on the upper and lower extremities of the specimen.
SR: steam refining
VB: visbreaking
SB: specimen break

TABLE 5

| Mixtures destined for waterproof membranes | | | |
|---|---|---|---|
| | TEST | | |
| | EX. 3 | EX. 7C | EX. 8C |
| Type of polymer | V | VI | VII |
| Penetration | | | |
| 25° C. dmm | 21 | 23 | 26 |
| 60° C. dmm | 100 | 105 | 116 |
| Viscosity cps(1) | 2600 | 2300 | 2060 |
| Embrittlement Temp °C. | −20/−25 | −20/−25 | −20/−25 |
| Embrittlement T 7 days at 80° C. | −18/−20 | −16/−18 | −13/−11 |
| Embrittlement T 14 days at 80° C. | −15/−18 | −13/−15 | −11/−9 |

(1): A Haake viscosimeter at 64 revolutions is used

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

We claim:

1. A mixture containing bitumen and a polymer composition, characterized in that the polymer composition consists essentially of
   A) 10-40 parts by weight of an isotactic propylene homopolymer with an isotactic index greater than 80, or a random copolymer of propylene with ethylene or a $C_4$-$C_{10}$ α-olefin having the formula $CH_2$=$CHR$, wherein R is an alkyl radical with 2-8 carbon atoms, or mixtures of ethylene and $C_4$-$C_{10}$ α-olefin, said copolymer having a content of ethylene or $C_4$-$C_{10}$ α-olefin or combinations thereof from 1 to 10% by weight, and an isotactic index in boiling n-heptane greater than 80;
   B) 0-20 parts by weight of a copolymer fraction containing over 55 wt. % ethylene, insoluble in xylene at ambient temperature;
   C) 50-80 parts by weight of a copolymer fraction of ethylene with propylene or $C_4$-$C_{10}$ α-olefin having the formula $C_2$=$CHR$, wherein R is an alkyl radical with 2-8 carbon atoms, or mixtures thereof, and optionally a minor quantity of diene, said copolymer fraction being soluble in xylene at ambient temperature, having an intrinsic viscosity greater than 1.5 and up to 2.2 dl/g and having 20 to 45 wt. % ethylene.

2. The mixture of claim 1, wherein the intrinsic viscosity of fraction C) of the polymer composition is from 1.6 to 2.0 dl/g.

3. The mixture of claim 1, where the polymer composition contains 20-40 parts by weight of fraction A), 2-20 parts by weight of fraction B), and 60-80 parts by weight of fraction C).

4. The mixture of claim 1, wherein the polymer composition is present in an amount from 3 to 40% by weight.

5. The mixture of claim 1, wherein the polymer composition is present in an amount from 3 to 10% by weight.

6. The mixture of claim 1, wherein the polymer composition is present in an amount from 10 to 30% by weight.

7. The mixture of claim 2, wherein the polymer composition is present in an amount from 3 to 40% by weight.

8. The mixture of claim 2, wherein the polymer composition is present in an amount from 3 to 10% by weight.

9. The mixture of claim 2, wherein the polymer composition is present in an amount from 10 to 30% by weight.

10. The mixture of claim 3, wherein the polymer composition is present in an amount from 3 to 40% by weight.

11. The mixture of claim 3, wherein the polymer composition is present in an amount from 3 to 10% by weight.

12. The mixture of claim 3, wherein the polymer composition is present in an amount from 10 to 30% by weight.

* * * * *